Figure 5:
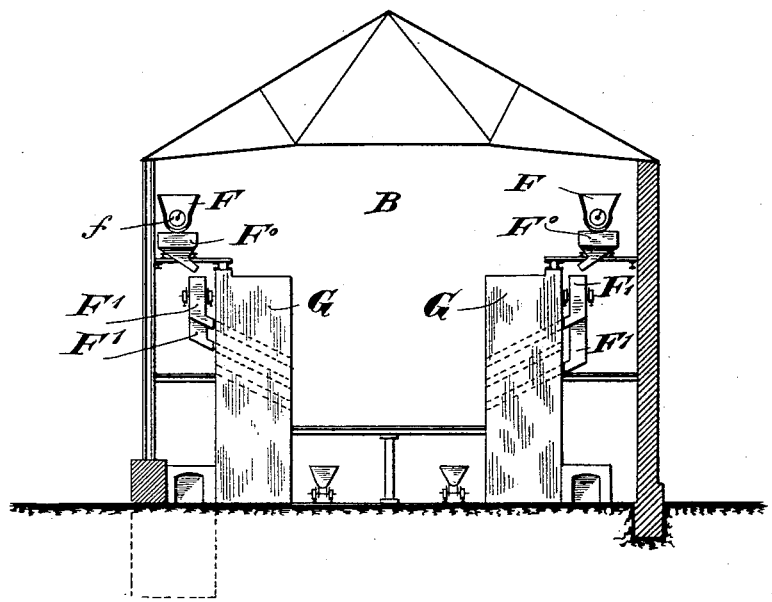

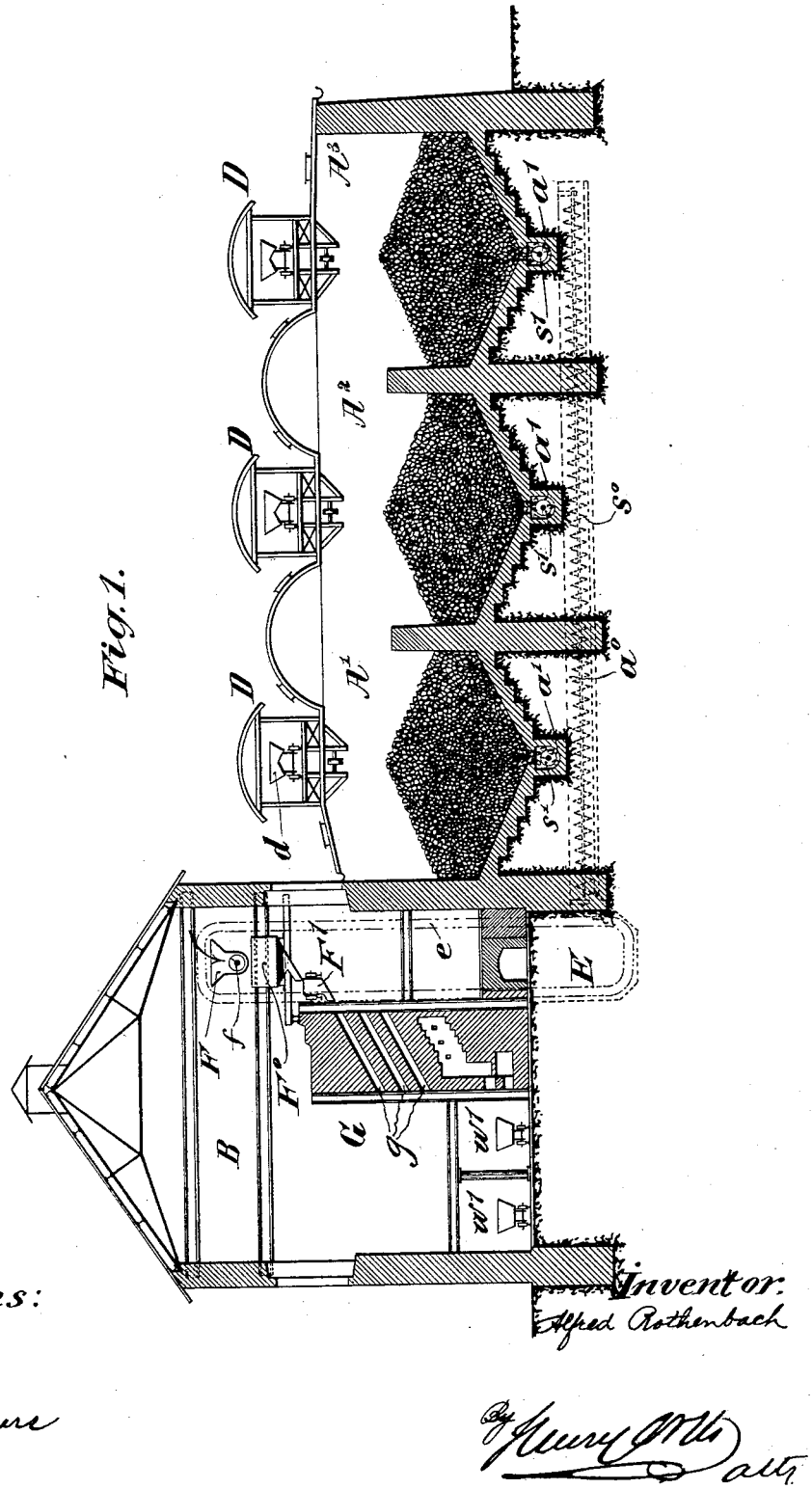

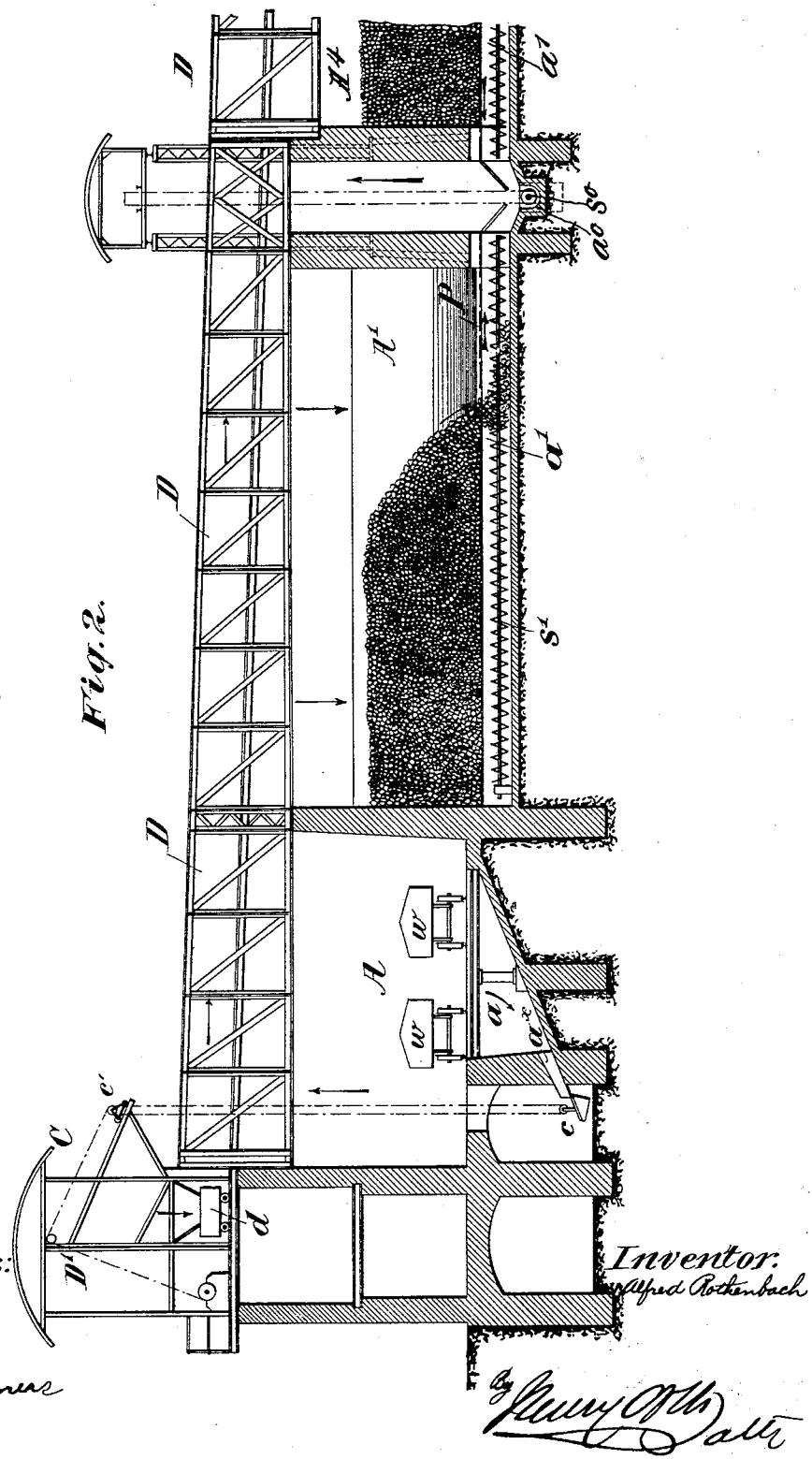

(No Model.) 4 Sheets—Sheet 3.
A. ROTHENBACH.
DEVICE FOR TRANSPORTING GRANULAR OR SIMILAR MATERIALS.
No. 591,696. Patented Oct. 12, 1897.
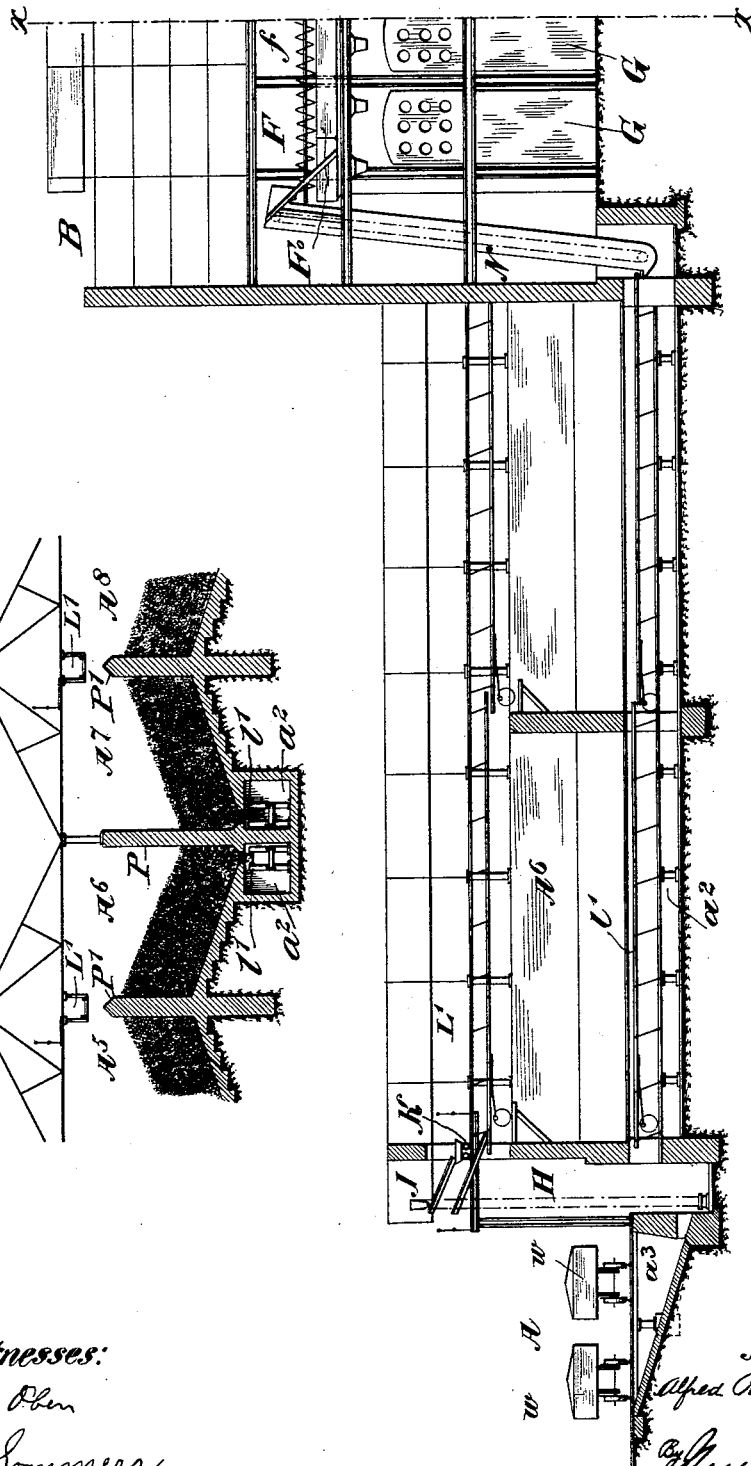

(No Model.) 4 Sheets—Sheet 4.

A. ROTHENBACH.
DEVICE FOR TRANSPORTING GRANULAR OR SIMILAR MATERIALS.

No. 591,696. Patented Oct. 12, 1897.

United States Patent Office.

ALFRED ROTHENBACH, OF ZURICH, SWITZERLAND.

DEVICE FOR TRANSPORTING GRANULAR OR SIMILAR MATERIALS.

SPECIFICATION forming part of Letters Patent No. 591,696, dated October 12, 1897.

Application filed June 3, 1897. Serial No. 639,299. (No model.)

*To all whom it may concern:*

Be it known that I, ALFRED ROTHENBACH, a citizen of the Republic of Switzerland, and a resident of Zurich, in the Republic of Switzerland, have invented certain new and useful Improvements in Devices for Transporting or Conveying Granular or Similar Materials, of which the following is a specification.

My invention has relation to the storage and delivery for transportation or other purposes of pulverulent, granular, or lumpy materials; and it has for its object the provision of means whereby these operations are performed mechanically and very expeditiously with a view to a saving of manual labor, simplification of displacement of the material from one point to another, and economy of space.

Generally speaking, the invention consists in the arrangement and construction of the storage-chambers, bins, or the like relatively to the place or point where the material taken from such chamber or bin is to be delivered for transportation or where the delivered material is to be worked up and in the arrangement of mechanical appliances whereby such material is mechanically removed from the place of storage to the vehicle used for its transportation or to an apparatus designed to work up such material.

The principles involved in the invention find, therefore, as is readily understood, a very wide range of application, and in order that my invention may be fully understood I have illustrated the same in its application to the manufacture of gas in a more or less generic manner, sufficient, however, to a full understanding thereof.

Figure 1 is a vertical cross-section of part of a plant for the manufacture of gas, showing the retort-house, coal-bins, and means for mechanically taking the coal from the bins and feeding it to the retorts. Fig. 2 is a vertical longitudinal section thereof. Fig. 3 is a vertical cross-section of a modified arrangement of storage-bins. Fig. 4 is a vertical longitudinal section, and Fig. 5 a cross-section on line $x\,x$ of Fig. 4 of part of a gas plant and storage-bins arranged as shown in Fig. 4 and appliances for feeding the coal to oppositely-arranged benches of retorts, and Fig. 6 is a sectional detail view.

With a view to saving space and to simplifying the transferring appliances the storage-bins, &c., are shown in the drawings as located immediately adjacent to the retort-house B, a plurality of such bins $A'$ $A^2$ $A^3$, &c., being arranged side by side on opposite sides of a delivery channel or trough running transversely along the ends of and common to all the bins.

In Figs. 1 and 2 it is assumed that the retort-house B has six bins, three on each side of a delivery-channel $a^0$. The coal-laden cars $w$ are run on suitable tracks to the point of discharge A over receiving-pits $a$, Fig. 2, into which the contents of said cars are dumped, said pits having an inclined bottom leading to a delivery-chute $a^\times$, that may discharge directly into a suitable bucket $c$, and raised to a point above the coal-bins by a suitable elevating mechanism C, where the bucket is automatically emptied into cars $d$, adapted to run on inclined overhead tracks D, arranged lengthwise of the coal-bins $A'$ $A^2$, &c., so that no power to move the loaded cars will be required, suitable well-known means being provided—as, for instance, well-known tilting devices to tilt and empty the cars as soon as they reach a certain point over one or the other of a pair of coal-bins below the particular track D over which such cars run. These tilting devices are preferably arranged so as to adapt them to be thrown into and out of operation to permit a car to travel, for instance, along the track above bin $A'$, Fig. 2, without being tilted to bin $A^4$ to be there tilted and its contents emptied thereinto, or said tilting appliances may be so arranged as to effect the distribution of the coal gradually over the length of a pair of bins $A'$ $A^4$. On the other hand, a suitable trap-door may be provided either in the bottom or side of the car and opened mechanically the moment said car is above the near bin $A'$, so as to cause the coal to move out gradually during the travel of the car over both bins $A'$ $A^4$.

Various means now in use may be employed to effect the automatic discharge of the coal-laden cars $d$ while traveling along the overhead track D, and in view of this I have deemed it unnecessary to illustrate any particular or specific means.

The coal-bins A' A², &c., have their bottoms constructed to converge from the sides to the longitudinal center of the bin, at which point there is a longitudinal channel $a'$ below the bin-bottom, in which works a screw conveyer $s'$. The conveyer channel or trough $a'$ may open directly into the bin throughout its length, or it may be covered by a roof made in sections, each section $p$, Fig. 2, constituting a valve or gate whereby the coal in the bin can be gradually delivered into the conveyer-channel by the successive removal of the plates $p$ from one end to the other of the bin, as from the outlet or forward end to the rear end of the bin, or vice versa.

The conveyer-channels $a'$ empty into the common transverse channel or trough $a^0$ above referred to, in which works a screw conveyer $s^0$, that conveyes the coal to a receiving-pit E, Fig. 1, below the retort furnace or furnaces G in the retort-house B, from which pit the coal is elevated into a distributing-trough F by any suitable elevating mechanism, as a bucket elevator. In the distributing-trough F works a screw conveyer $f$, that conveys the coal along such trough to the delivery-hoppers F⁰, and said distributing-trough F has an opening or openings in its bottom, through which the coal is fed to said delivery hopper or hoppers F⁰. Said hopper or hoppers F⁰ are provided with a spout that projects into the path of a feed-hopper F', arranged to travel along a track on one side of the retort furnace or furnaces above the benches of retorts $g$, which, as shown in Fig. 1, are inclined downwardly from the feed to the discharge end, a feed-hopper F' being provided for each bench of retorts and arranged so that its outlet will move in close proximity to the furnace-walls, the retort-gates opening either upwardly or downwardly, said feed-hoppers having their inlet in one and the same plane below the discharge-spout of the delivery hopper or hoppers F⁰, whose outlet is provided with a suitable gate or valve $g'$, Fig. 6. The outlet for the distributing-trough F does not require a gate, because when the stationary delivery-hopper F⁰ is full the coal therein will seal said opening, as shown in Fig. 6.

If desired, the outlet of the feed-hoppers F' may be provided with a gate $f^\times$, Fig. 6, instead of closing such outlet through the medium of the retort-furnace walls when out of line with the feed-opening of the retorts, as above stated.

The residues of the distillation of the coal—as the coke, cinders, ashes, &c.—may likewise be removed by mechanical means by being dumped into troughs or channels in which screw conveyers operate to convey such residues to a distant point, where they may be mechanically delivered into vehicles, or said products may be loaded in cars $w'$ $w'$, Fig. 1, traveling on tracks in a pit below the retort-house floor.

Figure 6:
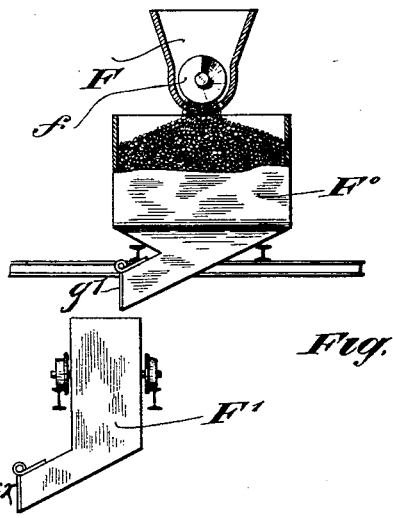

In Figs. 4 and 5 I have shown a modified arrangement of the coal-bins and the transferring mechanism, the latter suited to the transfer of the coal to oppositely-arranged retort-furnaces. In this arrangement the bottoms of the adjacent bins $a^6$ $a^7$ slope or converge toward their dividing or partition wall P and open into channels or passages $a^2$, in which work reciprocating trough conveyers $l'$ $l'$, that convey the coal to a bucket elevator N, which latter delivers such coal to the distributing-trough F, in which works the conveyer $f$, Fig. 4. From said trough F the coal passes to the delivery-hoppers F⁰ and thence to the feed-hoppers F' and retorts, as above described. In this arrangement the coal is also delivered from cars $w$ to a pit $a^3$, opening into an elevator-shaft H, in which works a bucket or other elevator that transfers the coal to reciprocating trough carriers L', through which it is delivered to the bins, and if desired crusher-rolls K may be arranged at the feed end J of the reciprocating trough conveyers for the purpose of comminuting the coal and whereby such coal is uniformly distributed lengthwise of the bins. These trough conveyers L' are arranged immediately above a partition P' between two bins $a^5$ $a^6$ or $a^7$ $a^8$, so as to deliver coal to both at one and the same time, the bins, as shown in Fig. 3, being arranged in pairs in such manner that the proximate bins of two pairs of such will have their discharge along the intervening partition P, Fig. 4. Furthermore, there may be any number of bins arranged end to end, the arrangement being such that two adjacent lines of bins will be on a line with two oppositely-arranged retort-furnaces G G and so that the transferring-channels of these lines of bins will be approximately in line with the charging-face of a retort-furnace or a line of successive retort-furnaces on opposite sides of the retort-house B, whereby the appliances for supplying the coal to the bins and the appliances for transferring the coal to the retorts can be materially simplified, while the removal of the residues of distillation can take place through channels or gangways below the floor and intermediate of the retort-furnaces, as shown in Fig. 5.

A plant organized as described will not only perform its function in a reliable manner, but is susceptible of continuous operation, while its capacity of displacement may readily be proportioned to the requirements.

From the description of the application of the principles underlying my invention to a specific purpose it will readily be seen that it will find application to many other purposes—as, for instance, the transfer and feeding of ores in reducing-works, the transfer of grain to and from storage-bins to vehicles or to and from storage-bins to milling appliances, &c.

Having thus described my invention, what I claim as new therein, and desire to secure by Letters Patent, is—

1. A system of storage and delivery for pulverulent, granular or lumpy substances, comprising a plurality of storage-bins, means for supplying the substance to be stored from above, a delivery-trough below each bin to which the bottom of the latter slopes and into which the contents of the bin discharge, a mechanical conveyer in said trough, a receiving-trough into which all the delivery-troughs discharge, a distribution-trough, mechanical conveying appliances for conveying the substance from the receiving to the distribution trough, and one or more delivery-hoppers adapted to receive the substance from the distribution-trough, for the purpose set forth.

2. A system of storage and delivery for pulverulent, granular or lumpy substances, comprising a plurality of storage-bins, means for supplying the substance to be stored from above, a delivery-trough below each bin to which the bottom of the latter slopes and into which the contents of the bin discharge, a mechanical conveyer in said trough, a receiving-trough into which all the delivery-troughs discharge, a distribution-trough, mechanical conveying appliances for conveying the substance from the receiving to the distribution trough, one or more delivery-hoppers adapted to receive the substance from the distribution-trough, and one or more feed-hoppers movable to and from the delivery hopper or hoppers and the appliance or appliances to which such substance is to be fed, for the purpose set forth.

In testimony whereof I hereunto sign my name, in the presence of two subscribing witnesses, this 11th day of May, 1897.

ALFRED ROTHENBACH.

Witnesses:
MORITZ VEITH,
H. LABHART.